Nov. 13, 1956     H. T. G. OOMS     2,770,203
BISCUIT-CUTTING MACHINES
Filed Oct. 17, 1950     4 Sheets-Sheet 1
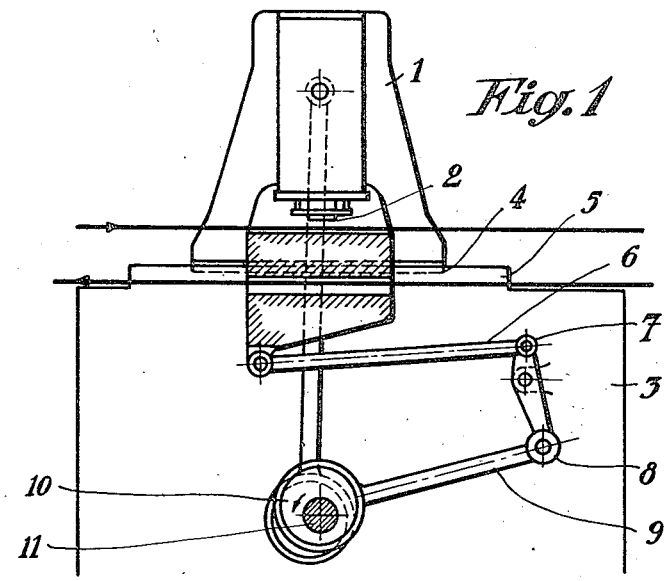
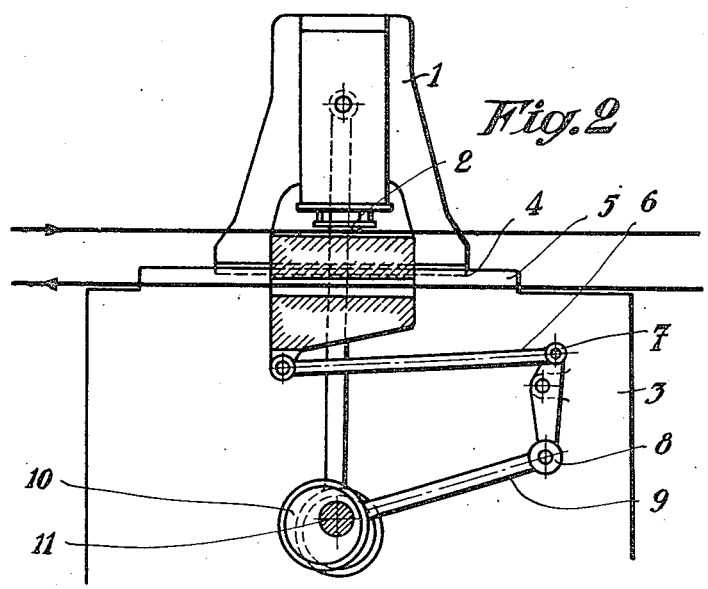

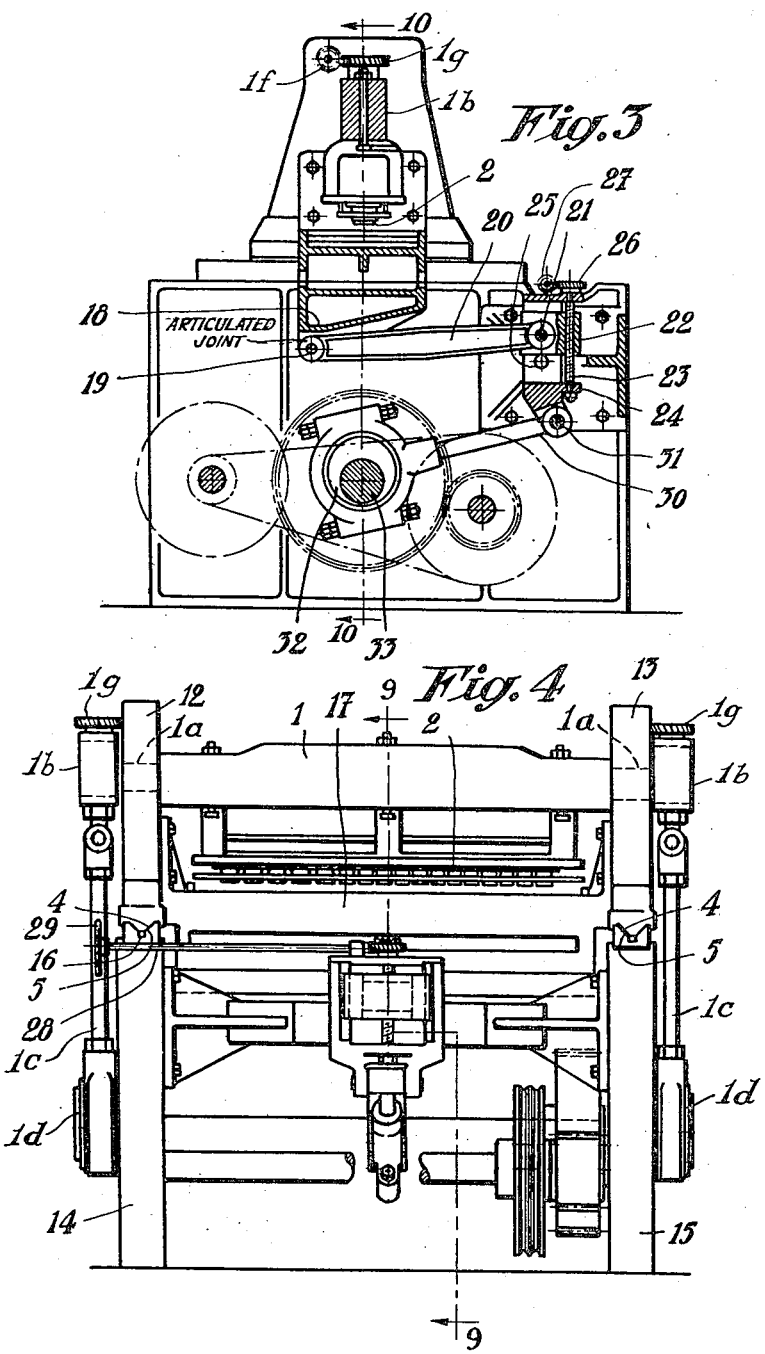

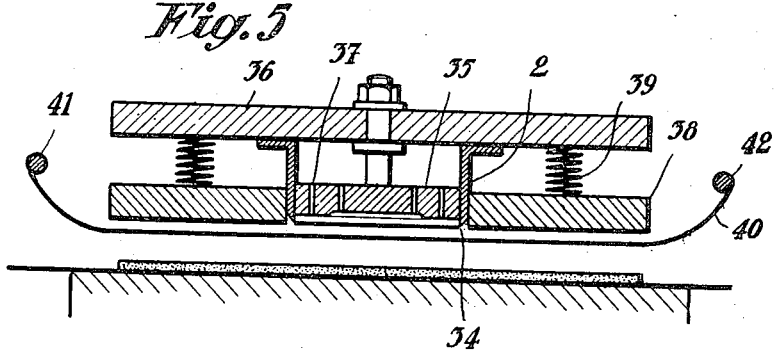
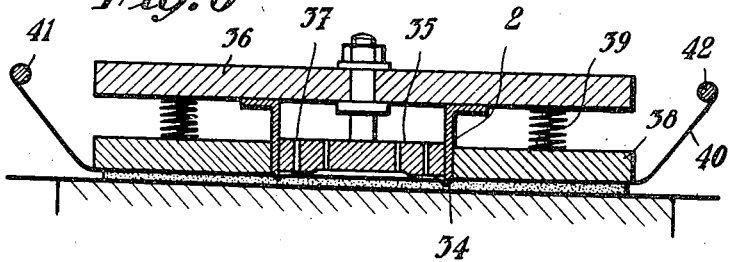
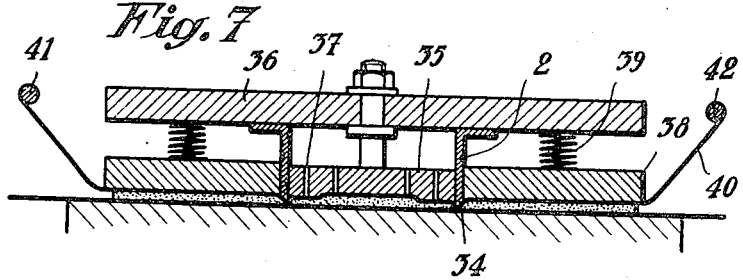
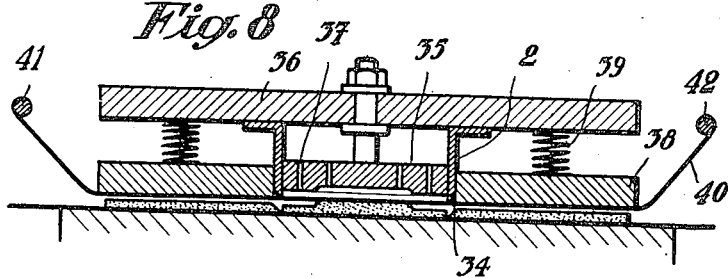

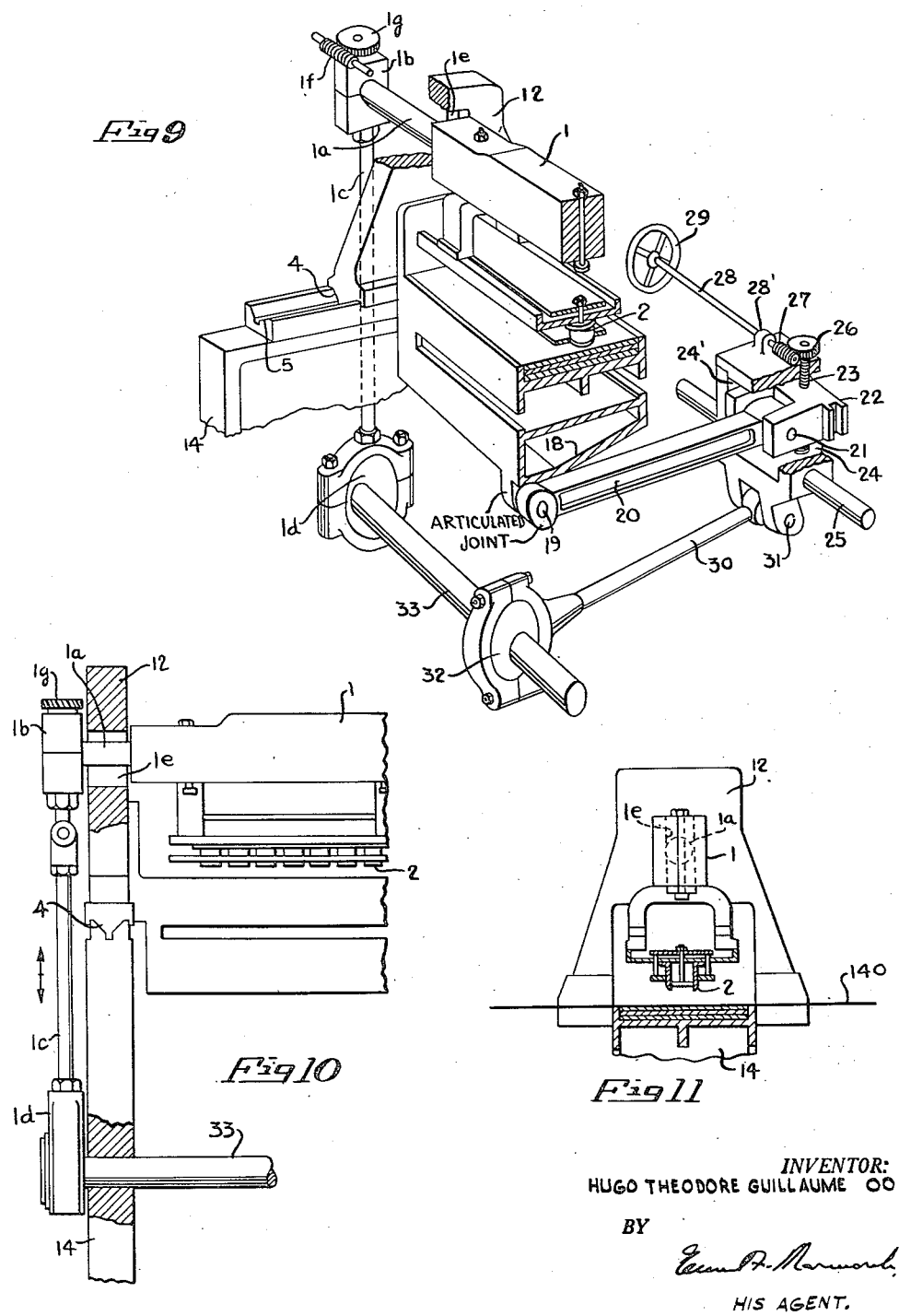

United States Patent Office 2,770,203
Patented Nov. 13, 1956

2,770,203

BISCUIT-CUTTING MACHINES

Hugo Theodore Guillaume Ooms, Antwerp, Belgium

Application October 17, 1950, Serial No. 190,486

Claims priority, application Belgium November 9, 1949

5 Claims. (Cl. 107—24)

The invention relates to biscuit-cutting machines in which a strip of paste passing continuously is periodically subjected to the action of cutting elements.

In this kind of machine, the cutting elements are known to be mounted on a moving bearing member, which is periodically acted upon in such a way that the speed at which the said cutting elements move is the same as that by which the strip of paste is moved. This arrangement is such that the speed of the movement of the paste, in relation to that of the instruments, is nil and the instruments work as if the paste were stationary.

In the machines known, the mobile support for the instruments is generally in the shape of a carrier driven by two symmetrical lateral connecting rods moved by an eccentric mechanism, which mechanism is in turn acted upon by a single power source. This kind of machine has serious drawbacks owing to the great difficulty of always ensuring an equal stress upon the two lateral connecting rods, above all after a certain time when the mobile pieces show signs of wear. It has been found that after a relatively short time, the lateral rods act in an irregular manner on the two sides of the carrier, irregularities particularly harmful in the cutting of the articles from the sheet of paste being the result. The biscuits produced are uneven, and it is difficult to maintain the machine in continuous working order. Moreover, it has also been observed that in the machines already known, the great number of connecting links in use are a constant source of trouble, the said links causing wear and, consequently, putting the machine out of order.

The present invention relates to improvements in such machines and the purpose of the improvements is solely to construct the mobile support of the cutting elements and the means of driving this mobile support in such a way that guiding is practically perfect, while the wear and tear is reduced to a strict minimum and, in any case, within limits unlikely to interfere with the good continuous working of the machine.

The practically perfect guiding of the mobile support is, according to the invention, assured by the application, for the first time in this class of machines used in biscuit factories, of a single rod acting directly on the mobile support in its middle and by the application between the said single rod and the said mobile support of an articulated joint; the other end of the single rod is linked up with one of the ends of a swing lever, the other end of which is worked by a driving-rod resting on an eccentric forming part of the driving shaft.

The single rod is pivoted and works in the longitudinal plane of symmetry of the mobile support of the cutting elements and the articulated joint protects the said mobile support from the accidental deformations of the single rod and/or of the other elements of the kinetic system which operates it. This systematic guiding of the mobile support is enhanced and the wear is considerably reduced by replacing the usual running elements, between the mobile support and the underlying fixed supports, by relatively important slide faces properly directed so as to impart to the said mobile support a constant action towards a correct centering.

According to a preferred form of embodiment, the bearing and slide faces of the mobile support are substantially arranged in the shape of a V and rest and move on fixed underlying faces of the same gradient. Moreover, the inclined faces of the said support end in a longitudinal channel connected with a container of lubricant.

These improvements, relatively very simple, are capable of giving to the kind of machines used in the making of biscuits quite new qualities, since by their application a practically continuous working is assured even when the machine has been in use for a long time; moreover, the machine may be used for a much longer period and the cost of maintenance is considerably reduced.

Moreover, the reliability resulting from this new conception of the guiding and the actual driving of the mobile elements of the machine is such that one can foresee considerable simplifications in the cutting-machines themselves. The certainty one has of a practically perfect guiding and of the return to the right posititon of the cutting elements allows of the notable simplification of the means of ejecting the small masses of cut paste.

It is evident that these improvements can be realized and employed in constructions widely differing in shape, so that it will be possible to apply them judiciously to every kind of existing machines. It will evidently be possible to construct new machines that comprise the said improvements.

Merely as an illustration, without any restriction whatever of the scope of the present invention, the said improvements are set forth below in detail, and the realisation of a machine comprising the said improvements is shown.

These examples are illustrated in the annexed drawings in which:

Figs. 1 and 2 very roughly diagrammatically show the machine embodying the invention in two characteristic positions;

Figs. 3 and 4 show in vertical section and in front elevation respectively, the essential elements of a machine to which the improvements of the invention are applied;

Fig. 5 is a vertical sectional view through the cutting device, showing the device at rest;

Fig. 6 is a sectional view, similar to Fig. 5, but showing the device at the beginning of the cutting;

Fig. 7 is a sectional view, similar to Figs. 5 and 6, but showing the device at the end of the cutting stroke;

Fig. 8 is a sectional view, similar to Figs. 5–7, but showing the cutting device during the return stroke;

Fig. 9 is a fragmentary perspective view, partly in section taken on line 9—9 of Fig. 4;

Fig. 10 is a fragmentary elevational view, partly in section taken on line 10—10 of Fig. 3; and Fig. 11 is a fragmentary sectional view taken along the upper part of line 9—9 of Fig. 4, showing the cutter sectioned and disclosing a conveyor.

In Figs. 1 and 2, 1 represents the mobile support or carriage of the cutting elements 2 of well known construction. Cutters 2 are suspended from a bridge member of the mobile support 1 as best shown in Figs. 9, 10 and 11. 3 represents the fixed support on which the said mobile support runs.

A first improvement consists in placing between the mobile support 1 and the underlying fixed support 3, the slide surfaces, 4 and 5 respectively. The mobile support 1, below and in its middle, is acted upon by a single rod 6 linked up with one of the ends 7 of a swing lever, the other end 8 being directly moved by a rod 9 actuated by an eccentric generally designated 10 in Figs. 1 and 2, and corresponding to eccentric 32 illustrated in Figs. 3 and 9, mounted on the driving shaft generally designated 11 in Figs. 1 and 2, and corresponding to shaft 33 illustrated in Figs. 3 and 10.

This kinetic arrangement is extremely simple and well known, but its application for the first time to a continuous biscuit machine, ensures an absolutely regular movement of the mobile support 1 and of the cutting elements 2, and the cooperation of this single central drive with the friction surfaces 4 and 5 guarantees, in addition to this practically total security of the systematic movement of the mobile elements, another security which is due to the practical elimination of the wear and tear of the mobile elements between the support 1 and the said subjacent friction surfaces 5.

If the application shown in Figs. 3 and 4 is studied, it will be seen that the improvements of the invention can be simple and rationally executed. In this example the mobile support consists of a bridge carrying one or two rows of cutters 2. Two uprights 12 and 13 are provided, and each has formed on its lower section two sloping slide surfaces 4. The latter rest on slide-ways secured to the surfaces 5 of the same gradient on the lateral uprights 14—15 of the fixed frame of the machine.

The bridge is vertically movably supported on axles 1a (see Figs. 9 and 10) which are held in bearings 1b. The bearings 1b are supported by rods 1c that are connected to eccentrics 1d that are connected to the shaft 33. The axles 1a protrude through and are in lateral abutment contact with the opposite vertical surfaces of vertical slots 1e that are formed in the uprights 12 and 13 (see Fig. 10).

A worm 1f and a worm wheel 1g are provided for each bearing 1b to adjust the bearing position by turning of the worm 1f (Figs. 3, 4, 9 and 10).

The inclined surfaces 5 of said uprights 14, 15 are more or less arranged in the shape of a V and end below in a common channel 16, which is connected with a box containing oil (not shown) so that a constant and simple lubrication is assured. Owing to the cooperation of the said slide surfaces 4 and 5, their gradient and their symmetrical arrangement on both sides of the longitudinal plane of symmetry of the machine, a perfect guiding of the mobile support and, above all, a practically negligible wear and tear of the mobile elements and their fixed support, are secured.

A conveyor 140 of conventional design is provided below the cutter 2 to transport the dough sheet before, during, and after cutter operation (see Figs. 5 to 8 inclusive).

On the same uprights 12—13 of the mobile support, there is secured a lower bridge 17, to the under part and the middle of which is linked, by means of an articulated joint 18—19, a single driving rod 20. The articulated joint 18—19 allows the said rod 20 to move in the vertical and slightly in the horizontal plane. In this way, whatever shiftings or accidental deformations of the rod 20 there may be, they will not affect the said mobile support 1. The single rod 20 is pivoted at its other end, by means of a pivot 21, on a slide 22 through which runs a threaded rod 23 resting on a swing lever 24 oscillating round a fixed spindle 25.

The slide 22 is slidable in a slot 24', that is formed in the lever 24, and is guided by the sidewalls thereof.

The threaded rod 23 is journalled at its upper end in a suitable bearing in the upper portion of swing lever 24 and provided at its lower end with a nut bearing on the lower portion of lever 24. Rod 23 is threaded through a threaded hole of the slide 22 and may be manipulated from the outside of the machine by means of a worm wheel 26 mounted on the end of the said threaded rod and permanently meshing with a worm 27, the shaft 28 of which is journalled in a bearing 28' and is extended and ends in a guiding wheel 29. The wheel 29 is located outside of the upright 14 (Fig. 1). The slide 22, the threaded rod 23, the wheel 26, the worm 27, the shaft 28, the bearing 28', and the guiding wheel 29 all partake in the rocking movement of the swing lever 24, as best shown in Figs. 3 and 9. When the said wheel 29 is turned in one direction or the other, the threaded rod 23 is turned to the right or to the left, which regulates the distance between the pivot 21 and the spindle 25. In this way the oscillation of the pivot 21 round the spindle 25 may be regulated as well as the amplitude of the rod 20 and the alternate longitudinal displacement of the mobile support and the cutting elements 22 which it bears. The swing lever 24 is directly acted upon by the rod 30, linked on the one hand by the pivot 31 on the lower end of the said swing lever 24, and on the other hand, journalled onto an eccentric 32 mounted on the driving shaft 33, which is driven directly or indirectly by the motor of the machine.

The working of the central drive is extremely simple, since the rotation of the driving shaft 33 causes the reciprocatory displacement of the rod 30, the oscillation of the swing lever 24 round the spindle 25, a reciprocatory displacement of the rod 20 and a corresponding displacement of the mobile support 1. The amplitude of the longitudinal reciprocatory movement of the said common support 1 is fixed, according to the adjustable distance which separates the pivot 21 from the spindle 25. As the rod 20 acts upon the said common support 1 in its longitudinal plane of symmetry and the connection between the said rod 20 and the said mobile support 1 is an articulated joint, an accurately centered and constant stress is assured. The position of the slide 22 is determined in proportion to the amplitude of the movement of the mobile support 1. It can be modified while the machine is working in order to regulate the machine and thus attain still better results.

By the introduction of such means of guiding and correct driving of the mobile parts of the cutting machine, it is possible to simplify the cutting elements and the ejectors considerably, as is seen in Figs. 5 to 8.

In the embodiment, as shown in the drawings, the cutter properly so called 2 is composed of a tubular element, cylindrical, for example, the lower edge 34 of which constitutes the cutter properly so called. This tubular element 2 comprises a bottom 35 fixed to a table 36, which is common to all cutters and suitably supported from the upper bridge member of the mobile support 1. This fixing is so that the height of the said bottom can be regulated. Moreover, this bottom is characterized by channels 37, which allows the air to escape during the process of the cutting. This arrangement is completed by the supporting plate 38 elastically upheld by the intercalated springs 39. Under the cutting device thus constructed there is arranged a band 40, attached by its two end edges to firmly fixed supports 41—42 forming part, for example, of the frame of the machine. This band 40, which is not of great thickness, is made of an elastic and very supple and strong substance, for example of latex, of a suitable composition of caoutchouc or of any suitable synthetic substance.

Fig. 5 shows the device at rest. The bottom 35 presents an under surface corresponding to the shape of the upper surface of the biscuit to be made. This same bottom 35 is immobilized in the tubular element 2 at a height determined by the thickness of the biscuit. The actual cutting passes through three successive stages, shown in Figs. 6, 7 and 8 respectively.

In Fig. 6 the device is shown as it comes in contact with the underlying strip of paste at the beginning of the cutting. The supple band 40 has been brought to bear on the underlying strip of paste by the supporting plate 38. The lower edge of the cutter 2 acts upon the said strip of paste through the corresponding part of the band 40. Fig. 6 illustrates this characteristic position. The air confined between the bottom 35 and the corresponding part of the supple band 40 can easily escape by the channels 37 during the cutting, which operation is shown in Fig. 7.

Thus it is possible, as can be observed, to shape faithfully the corresponding mass of paste according to the shapes presented by the lower surface of the said bottom 35.

It may also be noted that the elastic band 40 is tensioned by the elongations arising from the deformations caused by the displacement of the different mobile parts. Finally, the cutter is raised in the last phase, shown in Fig. 8. The elastic band 40 presses, by reaction, the cut biscuit against the underlying support, and the biscuit is expelled by the upward movement of the cutter.

The working of the device is systematic, and in spite of the great simplicity of the device, biscuits of elaborate designs may be produced.

Of course each of the elements described above and illustrated, for example in Figs. 3–8, may be replaced by an equivalent element or one working in an equivalent manner. Naturally the kinetic arrangement described and illustrated as a single centrally arranged drive may be replaced by any other arrangement complying with the conditions of the invention, that is to say by action on the mobile support 1 in a single point in the median plane or in the longitudinal plane of the machine. On the other hand, the improvements of the invention may be adapted to machines of all kinds and shapes. Finally, one or several of the characteristics may be made use of without any departure from the scope of the invention.

What I claim is:

1. In a biscuit-cutting machine, comprising at least one mobile support bearing the cutting elements and a fixed underlying support on which the said mobile support moves, slide surfaces formed between said mobile and fixed supports for reciprocation of the former on the latter, and means operable to move the said mobile support including a single central drive in the median longitudinal plane of the machine including a driving member reciprocable in said plane and connected to a portion of said mobile support located in said plane and below the level of said slide surfaces for applying thereto a force below the level of the slide surfaces.

2. A biscuit-cutting machine, comprising at least one mobile support bearing the cutting elements and a fixed underlying support on which the said mobile support moves, means to guide the mobile support including V-shaped slide surfaces formed symmetrically on both sides of the mobile support and means operable to move the said mobile support including a single central drive in the median longitudinal plane of the machine, said drive comprising a rocking lever on said fixed support, a connecting rod connected to said lever, an articulated joint between said mobile support and said connecting rod disposed centrally of said mobile support below the level of the slide surfaces, and means for rocking said lever.

3. In a biscuit-cutting machine having a support, in combination, a carriage reciprocably movable on said support and including means for cutting dough movably disposed on said support, guiding means between said carriage and said support and including spaced guides on said carriage and matching spaced guides on said support in engagement therewith, each guide of said support having oppositely inclined upwardly diverging slide surfaces and the guide of said carriage having downwardly converging slide surfaces in contact with the surfaces of the first named guide, and driving means for said carriage comprising a rocking member on said support, a powered rotary eccentric member on said support in driving connection with said rocking member for oscillating the same, and a connecting member linked to said rocking member and to said carriage at portions thereof below the level of the slide surfaces for reciprocating the latter, all of said members being disposed midway of the width of said carriage for positive movement thereof.

4. In a biscuit-cutting machine, as claimed in claim 3, further characterized in that said guides are arranged symmetrically of the width of said carriage, and an articulated joint disposed between said connecting member and said carriage for compensating accidentally occurring lateral carriage movements.

5. A biscuit-cutting machine, comprising at least one mobile support bearing the cutting elements and a fixed underlying support on which the said mobile support moves, oppositely inclined slide surfaces formed on each of said supports, the said surfaces of the said mobile support matching those of the said underlying fixed support and being in engagement therewith, and means operable to move the said mobile support including a single drive in the median longitudinal plane of the machine and connected to a portion of said mobile support lying in said plane and located below the level of said slide surfaces.

References Cited in the file of this patent

UNITED STATES PATENTS

| 413,453 | Mitchell | Oct. 22, 1889 |
| 821,003 | Trainer | May 22, 1906 |
| 1,204,671 | Lawrence | Nov. 14, 1916 |
| 1,784,432 | Green | Dec. 9, 1930 |
| 2,378,343 | Walter | June 12, 1945 |
| 2,491,317 | Klocke | Dec. 13, 1949 |
| 2,571,043 | Lange | Oct. 9, 1951 |